No. 746,207. Patented December 8, 1903.

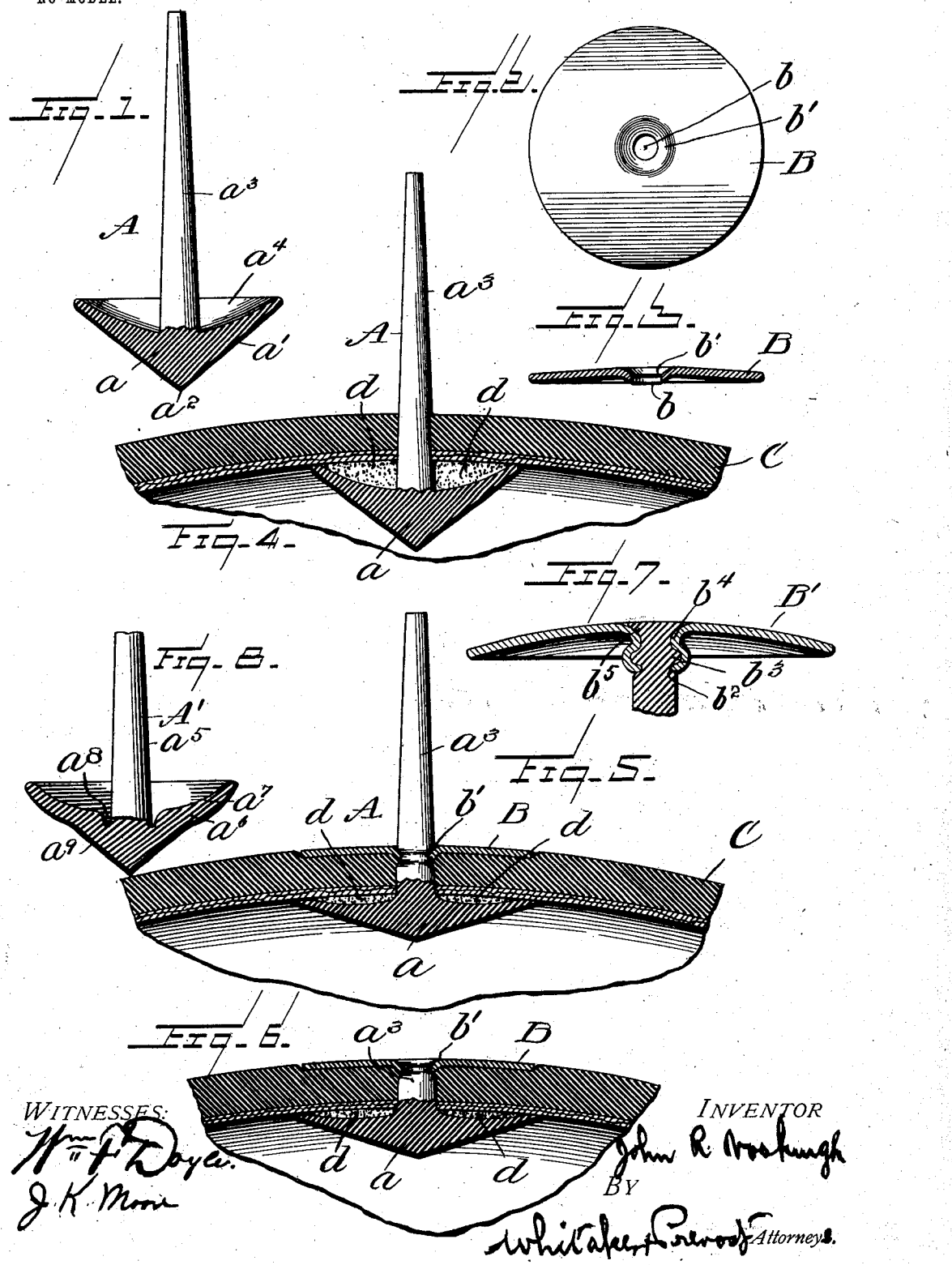

UNITED STATES PATENT OFFICE.

JOHN R. VOSBURGH, OF JOHNSTOWN, NEW YORK.

REPAIR DEVICE FOR PNEUMATIC TIRES.

SPECIFICATION forming part of Letters Patent No. 746,207, dated December 8, 1903.

Application filed September 10, 1903. Serial No. 172,635. (No model.)

*To all whom it may concern:*

Be it known that I, JOHN R. VOSBURGH, a citizen of the United States, residing at Johnstown, in the county of Fulton and State of New York, have invented certain new and useful Improvements in Repair Devices for Pneumatic Tires; and I do hereby declare the following to be a full, clear, and exact description of the invention, such as will enable others skilled in the art to which it appertains to make and use the same.

My invention is an improved repair device for pneumatic tires; and it consists in the novel features hereinafter described, reference being had to the accompanying drawings, which illustrate one form in which I have contemplated embodying the invention, and said invention is fully disclosed in the following description and claims.

Referring to the accompanying drawings, which form a part of this specification, Figure 1 represents a side elevation, partly in section, of the improved mushroom or umbrella plug forming a part of the repair device. Fig. 2 represents a plan view of the retaining and protecting plate, also forming part of the repair device. Fig. 3 represents a sectional view of the said plate. Fig. 4 is a view representing in section a portion of the pneumatic tire, showing a plug after insertion therein. Fig. 5 is a view similar to Fig. 4, showing the retaining and protecting plate applied to the stem of the plug. Fig. 6 is a similar view showing the stem of the plug cut off flush with the outer surface of the retaining and protecting plate. Fig. 7 is a sectional view of the retaining-plate, illustrating a modified construction. Fig. 8 represents a modified form of plug.

The object of my invention is to provide a convenient means for quickly and permanently repairing a pneumatic tire which has been punctured. For this purpose I employ a soft-rubber plug of the general form illustrated in Fig. 1, having a large head, which may be round or of any other desired configuration and is provided with a cone-shaped outer face, said plug having an elongated stem of less diameter than the enlarged head.

In the drawings, A represents the plug as a whole; $a$, the enlarged head, having the outer conical surface $a'$, forming a point $a^2$, and $a^3$ represents the elongated stem of the plug. The inner face of the enlarged head $a$ is preferably hollowed out in concave form, as shown in Fig. 1, forming a recess $a^4$ for the purpose of better holding the cement, by means of which the head is firmly united to the inner face of the tire. These plugs A are made with varying sizes of heads $a$ and with stems $a^3$ of different diameters for the purpose of closing punctures of different sizes, in accordance with the circumstances of the repair job for which they are employed.

B represents the retaining and protecting plate. (Illustrated in detail in Figs. 2 and 3.) This plate is shown in the present instance as being of circular form; but it may be of any other desired configuration, and it is preferably made convex on one side and concave on the other, so as to adapt it to conform to the exterior of a pneumatic tire. This plate B is provided, preferably in the center, with an aperture $b$, preferably of circular form, which is adapted to be forced upon stem $a^3$ of the rubber plug, and the aperture in said plate is made smaller than that portion of the stem of the plug with which it is used, which is adjacent to the head, so that an indentation will be made around the stem when the plate is forced upon the same. This stem $a^3$ of the plug is preferably made tapering slightly in order to facilitate the placing of the plate B upon the same. The plate B is also provided on its convex side with an annular depression $b'$, surrounding the aperture $b$, forming a recess. This annular recess or depression is preferably formed by depressing the metal of the plate, as shown in Figs. 2 and 3, and it is obvious that the complete plate so formed may be stamped by a single operation. The annular recess may, however, be performed in other ways, if preferred. The plate B is made in various sizes and with apertures $b$ and recesses $b'$ of various sizes to accommodate the various sizes of the plugs A.

The operation of making a repair is as follows: Supposing the pneumatic tire to have been punctured by a nail, a piece of glass, or other sharp object, the hole or puncture is first reamed out neatly, preferably by means of a red-hot piece of iron or wire, so as to leave a round hole. One of the mushroom or umbrella plugs A is then selected according to the size of the aperture to be plugged, it being desirable to have the stem $a^3$ of the plug fit tightly in said aperture. The head and a portion of the stem adjacent thereto are then coated with cement and the concave recess $a^4$ is well filled with the same, which may be conveniently accomplished by dipping the head of the plug in the cement, and the point $a^2$ of the head of the plug is inserted in the aperture of the tire C and the head forced through said aperture by means of a suitable tool, when the head will expand and the parts will be in the position illustrated in Fig. 4. By reference to this figure it will be observed that the peripheral edges of the head of the plug will engage the inner surface of the tire before the interior portions of the concave inner face, and the concave recess $a^4$ will serve to hold a quantity of the cement, which is indicated at $d$. The plate B is then placed in engagement with the stem of the plug by passing the end of the tapering stem through the aperture $b$, and the operator will force the plate B down the stem of the plug toward the head and at the same time pull upon the stem, so as to flatten the mushroom head of the plug against the inner wall of the tire. By pressing the plate B down firmly in the manner described it will be caused to substantially embed itself in the outer face of the tire, so that the outer face of the plate is substantially flush with the outer face of the tire, as shown in Fig. 5. The central aperture $b$ of the plate B being smaller than the stem of the plug, the edges of said aperture will embed themselves in the stem of the plug, as shown in Fig. 5, thereby giving the plate B a firm hold upon the stem. The portions of the stem immediately above the aperture $b$ of the plate will engage the annular recess $b'$ on the outer face of the plate, as also shown in Fig. 5, thus assisting in holding the plate and stem rigidly together. To complete the repair, it is only necessary to cut off the stem $a^3$ of the plug above the portion which lies in the annular recess $b'$ and flush with the outer face of the plate, as shown in Fig. 6, thus forming a very strong and durable repair.

The plate B is preferably made of thin sheet metal; but it may be made of any other material which may be found suitable for the purpose.

In Fig. 7 I have illustrated a slight modification of the retaining and protecting plate. In this figure the plate B' is provided with an aperture $b^2$, through which the stem of the rubber plug is passed. The material of the plate surrounding the aperture $b^2$ is depressed around the said aperture to form a short annular collar, which is provided interiorly with an annular groove or recess $b^3$, above which is an annular shoulder $b^4$ of substantially the diameter of the aperture $b^2$. The plate B' is also provided with an annular depression or recess $b^5$, surrounding and above the annular portion $b^4$. When this form of the plate is employed, the stem of the plug will be contracted where it passes through the aperture $b^2$ and the annular portion $b^4$ and will expand into the annular groove or recess $b^3$ and the annular recess $b^5$, thereby giving the plate a firm grip on the stem of the plug. The stem of the plug will also be coated with cement adjacent to the head and the cement will unite the stem to the plate and further assist in holding the parts permanently together.

Fig. 8 represents a slightly-modified form of plug. In this figure, A' represents the plug, having the long tapering stem $a^5$ and the mushroom or umbrella shaped head $a^6$. The inner face of the head is convex, as shown at $a^7$, and is provided with an annular recess $a^8$ around the base of the stem, the outer convex face being slightly swelled, as at $a^9$, to afford the necessary material to provide for this recess $a^8$ without weakening the plug. This form of plug will allow the stem to be drawn up through the metal plate to better advantage, and the recess $a^8$ will insure a quantity of cement being applied to the edges of the aperture in the tire and around the base of the plug.

What I claim, and desire to secure by Letters Patent, is—

1. In a repair device for pneumatic tires the combination with a plug of elastic material provided with an enlarged head and a stem, of a non-elastic plate provided with an aperture adapted to be forced upon and permanently secured to the stem, substantially as described.

2. In a repair device for pneumatic tires the combination with a plug of elastic material having an enlarged head and a stem, of a non-elastic plate provided with an aperture to engage said stem, and having recess in its outer face surrounding said aperture, substantially as described.

3. In a repair device for pneumatic tires the combination with a plug of elastic material provided with an enlarged head having a convex outer face, a concave inner face, forming a cement-holding recess, and a tapering elongated stem, of a permanent retaining-plate of non-elastic material provided with an aperture adapted to be forced upon the said stem, substantially as described.

4. In a repair device for pneumatic tires, the combination with a plug of elastic material having a stem and a head of larger diameter than the stem, of a retaining-plate having an aperture for the passage of the stem, and an annular collar around said aperture having an annular groove or recess to receive portions of the stem and assist in holding the plate upon said stem, substantially as described.

5. In a repair device for pneumatic tires, the combination with a plug of elastic material having a stem and a head of larger diameter than said stem, of a retaining-plate having a central aperture and a collar formed around said central aperture, and provided with an interior annular groove, forming an annular shoulder above said groove, said plate being also provided with an annular depressed portion above said annular shoulder, substantially as described.

6. In a repair device for pneumatic tires, a plug having a stem and a head of larger diameter than the stem, the said head being concave on the side adjacent to the stem and being provided with an annular recess surrounding the stem, substantially as described.

In testimony whereof I affix my signature in the presence of two witnesses.

JOHN R. VOSBURGH.

Witnesses:
HARWOOD DUDLEY,
JOHN M. RUSSELL.